United States Patent [19]
Kibby et al.

[11] Patent Number: 5,939,349
[45] Date of Patent: Aug. 17, 1999

[54] METHOD OF PREPARING NON-ZEOLITIC MOLECULAR SIEVE CATALYST

[75] Inventors: Charles L. Kibby, Benicia; Ross L. Provance, Richmond, both of Calif.

[73] Assignee: Chevron U.S.A. Inc., San Francisco, Calif.

[21] Appl. No.: 08/728,818

[22] Filed: Oct. 10, 1996

Related U.S. Application Data

[60] Provisional application No. 60/010,617, Jan. 26, 1996.
[51] Int. Cl.$^6$ .................................................. B01J 27/182
[52] U.S. Cl. ........................... 502/214; 502/213; 502/66
[58] Field of Search .................................... 502/213, 214, 502/66

[56] References Cited

U.S. PATENT DOCUMENTS

| | | | |
|---|---|---|---|
| 4,310,440 | 1/1982 | Wilson et al. | 252/435 |
| 4,440,871 | 4/1984 | Lok et al. | 502/214 |
| 4,500,651 | 2/1985 | Lok et al. | 502/208 |
| 4,567,029 | 1/1986 | Wilson et al. | 423/306 |
| 4,686,093 | 8/1987 | Flanigen et al. | 423/306 |
| 4,710,485 | 12/1987 | Miller | 502/213 |
| 4,724,066 | 2/1988 | Kirker et al. | 208/114 |
| 4,853,197 | 8/1989 | Wilson et al. | 423/306 |
| 4,861,743 | 8/1989 | Frank et al. | 502/214 |
| 4,867,861 | 9/1989 | Abdo et al. | 208/27 |
| 4,906,351 | 3/1990 | Pellet et al. | 208/111 |
| 4,913,798 | 4/1990 | Gortsema et al. | 502/213 |
| 4,943,424 | 7/1990 | Miller | 423/328 |
| 4,973,785 | 11/1990 | Lok et al. | 585/481 |
| 4,992,158 | 2/1991 | Schweizer | 208/65 |
| 4,992,401 | 2/1991 | Schweizer | 502/74 |
| 4,992,402 | 2/1991 | Schweizer | 502/74 |
| 4,992,617 | 2/1991 | Schweizer | 585/739 |
| 5,139,647 | 8/1992 | Miller | 208/100 |
| 5,158,665 | 10/1992 | Miller | 208/46 |
| 5,208,005 | 5/1993 | Miller | 423/702 |
| 5,246,566 | 9/1993 | Miller | 208/27 |
| 5,282,958 | 2/1994 | Santilli et al. | 208/111 |
| 5,514,362 | 5/1996 | Miller | 423/702 |

OTHER PUBLICATIONS

Database WPI. Section Ch, Week 9524. Derwent Publications Ltd., London, GB; Class E19, AN 95–182229. XP002032326 & JP 07 100 386 A (Toyota Jidosha KK). Apr. 18, 1995. See abstract.

EP 0 601 705 A (Ford Motor Co; Ford Werke AG (DE); Ford France (FR)) Jun. 15, 1994. See col. 3, line 57—col. 4, line 12.

*Primary Examiner*—Walter D. Griffin
*Assistant Examiner*—In Suk Bullock
*Attorney, Agent, or Firm*—Alan W. Klaassen

[57] ABSTRACT

An improved process is provided for adding a hydrogenation component to a non-zeolitic molecular sieve catalytic particulates with minimal loss in micropore volume for improved performance catalytic performance. The process includes adding an active source of the hydrogenation component dissolved in a non-aqueous solvent.

20 Claims, No Drawings

METHOD OF PREPARING NON-ZEOLITIC MOLECULAR SIEVE CATALYST

This patent application claims priority from U.S. Provisional patent application Ser. No. 60/010,617 filed Jan. 26, 1996, the specification of which is incorporated herein by reference for all purposes.

BACKGROUND OF THE INVENTION

The present invention relates to a catalytic material and to a process for preparing the same. More specifically, the present invention relates to a process for adding a hydrogenation component to a non-zeolitic molecular sieve (NZMS) in order to produce a catalyst material having higher activity for catalytic conversions than similar materials prepared using conventional methods.

The non-zeolitic molecular sieve to which the present invention is directed is a crystalline material having a three-dimensional microporous framework of $AlO_2$ and $PO_2$ tetrahedral units. Crystalline aluminophosphate compositions are disclosed in U.S. Pat. No. 4,310,440. Silicon substituted aluminophosphates are disclosed in U.S. Pat. No. 4,440,871. Metal substituted aluminophosphates are disclosed in U.S. Pat. No. 4,853,197. Each of these patents is incorporated herein by references for all purposes.

Catalysts containing a NZMS frequently contain a hydrogenation component. U.S. Pat. No. 4,440,871 teaches SAPO catalyst compositions which contain a hydrogenation promoter such as platinum, palladium, tungsten and molybdenum. U.S. Pat. No. 4,906,351 teaches a hydrodewaxing process using a catalyst comprising an effective amount of at least one NZMS selected from the group consisting of SAPO, ELAPSO, MeAPO, FeAPO, TiAPO and ELAPO molecular sieves, and containing a hydrogenation component, which may be selected from the group of hydrogenation catalysts consisting of one or more metals of Group VIB and Group VIII. U.S. Pat. No. 4,906,351 further teaches adding the hydrogenation component to the catalyst.

U.S. Pat. No. 5,282,958 provides an example of a method for preparing an intermediate pore molecular sieve dewaxing catalyst by ion exchanging a catalyst support with 0.5 wt % palladium or platinum from an aqueous solution of $Pd(NH_3)_4(NO_3)_2$ or $Pt(NH_3)_4(NO_3)_2$. U.S. Pat. No. 5,246,566 teaches adding a Pt promoter to SAPO-11 bound with 35% Catapal by impregnating the extrudates with 0.5% Pt as $Pt(NO_3)_4Cl_2.H_2O$. U.S. Pat. No. 5,139,647 teaches impregnating extrudates of SAPO-11 bound with Catapal alumina using an aqueous solution of $Pd(NH_3)_4(NO_3)_2$.

U.S. Pat. No. 4,710,485 teaches growing crystals of a silicoaluminophosphate molecular sieve from an aqueous medium containing a water soluble compound of a Group VIII metal. Thus, the Group VIII metal is occluded within the pores of the molecular sieve by incorporating a water-soluble salt of the desired metal into the forming solution of the molecular sieve and then growing the silicoaluminophosphate molecular sieve crystals by subjecting the reaction mixture to hydrothermal treatment, and dehydrating the resulting product.

With the cost of preparing catalytic materials continually increasing, it is vitally important to develop new methods of preparing catalysts for improved activity and selectivity. The present method, directed to non-zeolitic molecular sieve containing catalysts, provides a surprising improvement over conventional catalyst-preparation methods.

SUMMARY OF THE INVENTION

It is one object of the present invention to prepare a non-zeolitic molecular sieve, containing a hydrogenation component, as an active catalyst for the conversion of a hydrocarbonaceous feedstock. It is a further object of the present invention to prepare a non-zeolitic molecular sieve, which contains a hydrogenation component, such that the molecular sieve retains a high micropore volume. It is a further object of the present invention to provide a process for adding a hydrogenation component to a non-zeolitic molecular sieve containing catalyst with little or no reduction in the micropore volume of the molecular sieve.

Accordingly, a process is provided for preparing a non-zeolitic molecular sieve catalyst, said process comprising combining non-zeolitic molecular sieve-containing particulates having a first micropore volume with an active source of a hydrogenation component to produce non-zeolitic molecular sieve catalytic particulates having a second micropore volume which is at least about 70% of the first micropore volume.

In a separate embodiment, the present invention is directed to a process for preparing a non-zeolitic molecular sieve catalyst, said process comprising contacting non-zeolitic molecular sieve-containing particulates, having a first micropore volume, with a solution containing an active source of an hydrogenation component dissolved in a non-aqueous solvent and removing substantially all of the non-aqueous solvent at a temperature and for a time sufficient to produce non-zeolitic molecular sieve catalytic particulates having a second micropore volume which is at least about 70% of the first micropore volume.

Further to the invention is a catalyst prepared by combining a non-zeolitic molecular sieve with a matrix material to form NZMS-containing particulates and contacting the NZMS-containing particulates with an active source of at least one hydrogenation component contained in a non-reactive solvent.

Further to the invention are catalytic particulates comprising a non-zeolitic molecular sieve and a hydrogenation component, the catalytic particulates having a micropore volume of greater than 45 microliters per gram, preferably in the range of 50 to 100 microliters per gram of catalytic particulates. As used herein, micropore volume relates to the volume contained within pores having an effective diameter of about 20 microns or less in the pore structure of the catalytic particulates.

Among other factors, the present invention is based on the surprising discovery that using non-aqueous solutions of hydrogenation components for preparing non-zeolitic molecular sieves-containing catalytic particulates significantly increases the catalytic performance of the particulates when used, for example, in the dewaxing of lubricating oil base stocks.

DETAILED DESCRIPTION OF THE INVENTION

In the present invention, catalytic particulates comprising a non-zeolitic molecular sieve (NZMS) and a hydrogenation component are prepared by a method comprising contacting non-zeolitic molecular sieve-containing particulates with a non-aqueous solution of an active source of the hydrogenation component.

Non-zeolitic molecular sieves are microporous compositions that are formed from $AlO_2$ and $PO_2$ tetrahedra and have electrovalently neutral frameworks. See U.S. Pat. No. 4,861,743. Non-zeolitic molecular sieves include aluminophosphates ($AlPO_4$) as described in U.S. Pat. No. 4,310,440, silicoaluminophosphates (SAPO), metalloaluminophosphates (MeAPO), and nonmetal substituted aluminophosphates (ElAPO). Metalloaluminophosphate molecular sieves that may be useful as isomerization catalysts are described in U.S. Pat. Nos. 4,500,651; 4,567,029; 4,544,143; and 4,686,093. Nonmetal substituted aluminophosphates are described in U.S. Pat. No. 4,973,785. The method of the present invention is particularly useful in preparing catalytic particulates containing at least one of the intermediate pore molecular sieves SAPO-11, SAPO-31 and SAPO-41. U.S. Pat. No. 4,440,871 describes SAPO's generally and SAPO-11, SAPO-31, and SAPO-41 specifically. The most preferred intermediate pore SAPO for use in the present invention is SM-3 which has a crystalline structure falling within that of the SAPO-11 molecular sieves. The preparation of SM-3 and its unique characteristics are described in U.S. Pat. Nos. 4,943,424 and 5,158,665. The entire disclosure of each of these patents is incorporated herein by reference for all purposes.

Methods for forming a non-zeolitic molecular sieves may be found, for example, in U.S. Pat. Nos. 4,440,871; 4,710,485; and 4,973,785, the entire disclosures of which are incorporated herein by reference. Non-zeolitic molecular sieves are generally synthesized by hydrothermal crystallization from a reaction mixture comprising reactive sources of aluminum, phosphorus, optionally one or more elements, other than aluminum and phosphorous, which are capable of forming oxides in tetrahedral coordination with $AlO_2$ and $PO_2$ units, and one or more organic templating agents. The reaction mixture is placed in a sealed pressure vessel and heated, preferably under autogenous pressure at a temperature of at least about 100° C., and preferably between 100° C. and 250° C., until crystals of the molecular sieve product are obtained, usually for a period of from 2 hours to 2 weeks. After crystallization the crystals may be isolated and washed with water and dried in air. While not required in the present process, it has been found that catalytic materials of superior performance may be realized when the reaction mixture containing sources of the molecular sieve is processed at conditions sufficient to reduce the size of any particles which may be present in the reaction mixture such that 80% by weight of the particles have a diameter of less than 80 microns. Such methods are disclosed in U.S. Pat. No. 5,208,005, the entire disclosure of which is incorporated herein by reference. In a separate embodiment, the non-zeolitic molecular sieve may be crystallized in a dense gel comprising active sources of the molecular sieve, a templating agent and sufficient water to form the dense gel into particles. Such methods are disclosed in U.S. Pat. No. 5,514,362, the entire disclosure of which is incorporated herein by reference.

The NZMS-containing particulates may be prepared having a wide variety of physical forms. Generally speaking, the particulates can be in the form of a powder, a granule, or a molded product, such as extrudate having a particle size sufficient to pass through a 2-mesh (Tyler) screen and be retained on a 40-mesh (Tyler) screen. In cases where the molecular sieve is molded, such as by extrusion with a binder, the molecular sieve can be extruded before drying, or, dried or partially dried and then extruded.

In the preparation of the non-zeolitic molecular sieve as a catalyst, the NZMS may be composited with porous matrix materials and mixtures of matrix materials, such as silica, alumina, titania, magnesia, silica-alumina, silica-magnesia, silica-zirconia, silica-thoria, silica-beryllia, silica-titania, titania-zirconia, as well as ternary compositions such as silica-alumina-thoria, silica-alumina-titania, silica-alumina-magnesia and silica-magnesia-zirconia, to form the NZMS-containing particulates. Silica, alumina and silica-alumina matrix materials are preferred. The matrix can be in the form of a cogel. Compositing the crystallites with an inorganic oxide matrix or binder can be achieved by any suitable known method wherein the crystallites are intimately admixed with the oxide matrix precursor while the latter is in a hydrous state (for example, as a hydrous salt, hydrogel, wet gelatinous precipitate, or in a dried state, or combinations thereof). A convenient method is to prepare a hydrous mono or plural oxide gel or cogel using an aqueous solution of a salt or mixture of salts (for example aluminum and sodium silicate). Ammonium hydroxide carbonate (or a similar base) is added to the solution in an amount sufficient to precipitate the oxides in hydrous form. Then, the precipitate is washed to remove most of any water soluble salts and thoroughly admixed with the crystallites. Water or a lubricating agent can be added in an amount sufficient to facilitate shaping of the mix (as by extrusion). Depending on the application, the quantity of water in the particulates can vary over a wide range. The particulate can be up to 100% non-zeolitic molecular sieve. Particulates containing at least one non-zeolitic molecular sieve composited with a matrix material will generally contain from about 1% to about 99% by weight of the non-zeolitic molecular sieves. The preferred particulates will contain from about 45% to about 95% by weight of the non-zeolitic molecular sieve. More preferred are particulates containing from about 75% to about 90% by weight of the non-zeolitic molecular sieves.

The as-synthesized NZMS in the NZMS-containing particulates contains within its intracrystalline pore system at least one form of a template employed in its formation. Generally, the template is a molecular species, but it is possible, steric considerations permitting, that at least some of the template is present as a charge-balancing cation. Generally the template is too large to move freely through the intracrystalline pore system of the sieve and may be removed by a post-treatment process, such as by calcining the NZMS at temperatures of between about 200° C. and to about 700° C. so as to thermally degrade the template or by employing some other post-treatment process for removal of at least part of the template. In some instances the pores of the NZMS are sufficiently large to permit transport of the template, and, accordingly, complete or partial removal thereof can be accomplished by conventional desorption procedures such as carried out in the case of zeolites. While not required, it is preferred that the template be removed from the pores of the NZMS before the hydrogenation component is added to the NZMS. After the template has been removed, it is preferred that the NZMS be stored out of contact with water in either the liquid or vapor state.

In the present process, not only are catalytic particulates of high catalytic activity formed, the catalytic particulates also retain a high micropore volume. While not wanting to be bound by theory, it appears that the high micropore volume retained in the present catalytic particulates is one of the factors resulting in the surprisingly high catalytic activity of the particulates. In the present process, non-zeolitic molecular sieve-containing particulates having a first micropore volume are combined with an active source of at least one hydrogenation component at conditions sufficient to produce non-zeolitic molecular sieve catalytic particulates having a second micropore volume wherein the second micopore volume is at least about 70% of the first micropore volume. The preferred non-zeolitic molecular sieve-containing particulates have a micropore volume (i.e. the first micropore volume) of at least about 50 microliters per gram of particulates, and more preferably in the range from about 50 to about 100 microliters per gram of particulates.

The preferred catalytic particulates have a micropore volume (i.e. the preferred second micropore volume) of at least about 45, more preferably in the range from about 45 to about 100, and still more preferably in the range from about 50 to about 100 microliters per gram of catalytic particulates. The micropore volume of any particulate which may be prepared as described herein will, of course, depend somewhat on the amount of molecular sieve present in the particulates, i.e. particulates containing proportionally more molecular sieve will generally have a correspondingly higher micropore volume.

Micropore volume as used herein relates to pores having an effective diameter of about 20 angstroms or smaller. Micropore volume may be suitably determined from a standard isotherm of, for example, nitrogen or argon physisorption on a sample of particulates. The procedure for measuring micropore volume by physisorption is laid out in S. J. Gregg and K. S. W. Sing, *Adsorption, Surface Area and Porosity*, London: Academic Press, Inc., 1982. The description of the α-plot method for determining porosity is particularly described on pages 98–100.

The preferred hydrogenation component which is added to the particulates according to the present invention is selected from the group consisting of at least one platinum or noble group metal, which includes platinum, palladium, rhodium, ruthenium, iridium and mixtures thereof or at least one base metal selected from the group consisting of nickel, molybdenum, cobalt, tungsten, titanium, chromium and mixtures thereof. Platinum and/or palladium are most preferred. As recognized in the art, the noble and base metals will not generally be employed in the same catalyst system. Reference to the catalytically active metal or metals is intended to encompass such metal or metals in the elemental state or in some form such as an oxide, sulfide, halide, carboxylate and the like. Active sources of the hydrogenation component include the salts and complexes containing such metals.

The active source of the hydrogenation component is added to the non-zeolitic molecular sieve particulates by ion exchange or by impregnation from a non-aqueous solution containing the active source. The hydrogenation component is present on the catalytic particulates in an amount sufficient to catalyze the hydroconversion of a reaction stream such as a hydrocarbon stream at hydroconversion conditions. When the hydrogenation component is a noble metal it is generally present in an amount between about 0.05% and about 1.5% by weight based on the total weight of the catalytic particulates including the weight of any binder or matrix material which may be present, although effective amounts outside this range may be employed. The preferred effective amount of the noble metal hydrogenation component is between about 0.3% and about 1.2% by weight. When the hydrogenation component is a base metal(s) the effective amount will generally be between about 1.0% and about 30% by weight or more of the base metal, expressed as the oxide(s), based on the total weight of the catalytic particulates, although effective amounts outside this range may be employed.

The solvent which is useful in the present process is a non-reactive solvent in which the active source of the hydrogenation component is suitably soluble for preparing the catalytic particulates according to the present invention. By non-reactive is meant being capable of adding an active source of the hydrogenation component in solution to the NZMS-containing particulates with little or no associated reduction of the micropore volume of the particulates. The preferred solvent is a non-aqueous solvent. By non-aqueous solvent is meant a liquid which is substantially free of dissolved water, i.e. a solvent other than water which contains no more than impurity amounts of dissolved water. It is preferred that the amount of dissolved water in the solvent be less than 5%, more preferably less than 1% and still more preferably less than 0.5%. Solvents which absorb only small amounts of water when in equilibrium with liquid water are useful non-reactive solvents in the present invention. Other solvents which demonstrate a tendency to absorb water either in contact with liquid waster or a water-containing atmosphere, are also useful but they may require careful handling to reduce their exposure to water vapor. Both pure solvents and mixtures of solvents are useful in the practice of the invention, so long as the water content in the solvent is maintained at a low level.

The preferred non-reactive solvent is also chosen to minimize loss of micropore volume of the catalytic particulates during the drying and activation steps. Solvents with a normal boiling point of greater than about 40° C. are preferred, since the rapid evaporation rate of lower boiling solvents tends to hinder proper dispersion of the hydrogenation component. A desirable non-reactive solvent is also easily removable from the catalytic particulates without leaving a residue which will react during a heat treatment step to form water or leave a carbon deposit on the catalytic particulates. Thus, it is preferred that the non-aqueous solvent have a boiling point of less than 100° C. to facilitate removal. Alternatively, it is preferred that the non-aqueous solvent, if having a normal boiling point above 100° C., contain minimal oxygen as part of the solvent molecule, in order to prevent the formation of water during heating steps following addition of the hydrogenation component. The preferred non-aqueous solvent boiling above 100° C. comprises greater than 50%, more preferably greater than 60% and still more preferably greater than 70% oxygen-free molecules.

Suitable, non-limiting examples of solvents which may be useful in the present process include aromatic compounds such as benzene, toluene, xylene and alkyl substituted analogs thereof, aliphatic compounds such as cyclohexane, cyclopentane, hexane, pentane, heptane, octane, nonane, decane and alkyl substituted analogs thereof, oxygenated solvents such as acetone, ethanol, methanol, propanol, butanol and alkyl substituted analogs thereof, halogenated hydrocarbons such as methylene chloride, chloroform, carbon tetrachloride and alkyl substituted analogs thereof, and HFC's such as $CH_3$—$CF_2$—$CH_2F$, and alkyl substituted analogs thereof. Non-limiting examples of alkyl-substituted analogs include alkyl benzene, alkyl cyclohexane, alkyl cyclopentane, alkyl hexane, alkyl pentane, alkyl heptane, alkyl nonane, where alkyl refers to at least one of $CH_3$—, $C_2H_5$—$C_3H_7$— and $C_4H_9$—.

In the practice of the present invention, NZMS-containing particulates having a first micropore volume are contacted with an active source of a suitable hydrogenation component dissolved in a non-reactive solvent. Generally, the NZMS-containing particulates are allowed to contact the solution for sufficient time to equilibrate with the solution, in order to maximize the dispersion of the hydrogenation component on the particulates. Reaching equilibrium may require several hours or more. In this way, with platinum and/or palladium being the hydrogenation component, the dispersion of the hydrogenation component is often greater than 70%, and may be as high as 80% and even 90% where dispersion is determined as the hydrogen/hydrogenation metal atom ratio as determined by hydrogen chemisorption.

Following addition of the solution containing the hydrogenation component to the molecular sieve-containing particulates, the solvent is removed in a drying step, followed generally by a calcination/activation step. Conditions for solvent removal are chosen to achieve high dispersion of the hydrogenation component and to achieve high micropore volume in the catalytic particulates. Thus, removal temperatures at ambient pressures are preferably maintained at least about 25° F. below the normal boiling point of the solvent or solvent mixture, until at least about 25% by volume of the solvent has been removed from the particulates. In order to maintain high dispersion of the hydrogenation component on the catalytic particulates, preferred solvents for the present method have a normal boiling point above about 40° C., more preferably above 50° C., and most preferably above 55° C. It is preferred that the solvent be removed during the drying step and prior to any calcination step, to avoid the solvent burning to form water during the calcination step.

The catalytic particulates may be desirably subjected to an activating treatment to render the final composition catalytically active. Such treatment involves heating the dried material at a temperature in the approximate range of 250° F. to 1100° F. to effect at least partial conversion of the metal content to a catalytically active state. In a preferred aspect of the invention, the bound molecular sieve is subjected to treatment in an atmosphere containing free oxygen, such as air, at a temperature within the approximate range of 250° F. to 1100° F. for from about ¼ hour to 24 hours and thereafter in an atmosphere of hydrogen at a temperature within the above range to effect at least partial reduction of metal-containing ion to free metal.

The active source of the hydrogenation component is usefully of a form which will dissolve in the non-reactive solvent or mixtures of solvents. Both organic and inorganic compounds of the hydrogenation component, including salts and complexes, are suitable sources. Chloroplatinic acid is an inorganic source of platinum. A particularly preferred source of the hydrogenation component is a bis (beta-diketonato) metal (II) complex, having the general form:

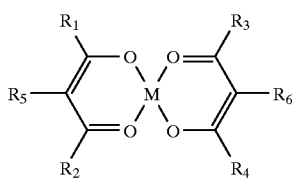

wherein $R_1$–$R_6$ is independently selected from hydrogen, a hydrocarbon having from 1 to 4 carbon atoms, and benzyl, and wherein M is selected from the group consisting of platinum, palladium, rhodium, ruthenium, iridium, nickel, molybdenum, cobalt, tungsten, titanium and chromium. Non-limiting examples of suitable R groups include —$CH_3$, —$CH_2CH_3$, —$CH_2CH_2CH_3$, —OH, —$OCH_3$, —$OCH_2CH_3$, —$OCH_2CH_2CH_3$, —$C_6H_5$ and —$CF_3$. It is preferred that M is selected from the group consisting of platinum, palladium, rhodium, ruthenium and iridium, and more preferred that M is selected from the group consisting of platinum and palladium. When M is platinum and each of $R_1$=$R_2$=$R_3$=$R_4$=—$CH_3$, and $R_5$=$R_6$=—H, the complex is named platinum (ii) 2,4-pentanedionate (CAS: 15170-57-7). Some of the listed metals M are trivalent, and have the corresponding tris form of the metal complex.

A similar structure which is also suitable is as follows:

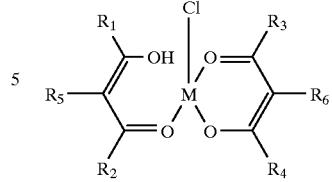

Therefore, in a specific embodiment of the present process for preparing a non-zeolitic molecular sieve catalytic particulates, the process comprises contacting non-zeolitic molecular sieve-containing particulates, having a first micropore volume, with a solution containing an active source of an hydrogenation component, preferably a platinum and/or palladium-containing component and more preferably platinum (ii) 2,4-pentanedionate and/or palladium (ii) 2,4-pentanedionate, dissolved in a non-reactive solvent, preferably a non-aqueous solvent and more preferably toluene, benzene and/or xylene and removing substantially all of the non-reactive solvent at a temperature and for a time sufficient to produce catalytic particulates having a second micropore volume which is at least about 70% and preferably at least about 80% of the first micropore volume.

The catalytic particulates prepared using the present method can be used in a process for selectively producing middle distillate hydrocarbons by hydrocracking a hydrocarbonaceous fed wherein at least 90% of the feed has a boiling point above about 600° F. The hydrocracking conditions include reaction temperatures which generally exceed about 500° F. (260° C.) and are usually above about 600° F. (316° C.), preferably between 600° F. (316° C.) and 900° F. (482° C.). Hydrogen addition rates should be at least about 400, and are usually between about 1,000 and about 15,000 standard cubic feet per barrel. Reaction pressures exceed 200 psig (13.7 bar) and are usually within the range of about 500 to about 3000 psig (32.4 to 207 bar). Liquid hourly space velocities (LHSV's) are less than about 15 $hr^{-1}$, preferably between about 0.2 and about 10 $hr^{-1}$. The process enables heavy feedstocks, such as gas oils, boiling above 600° F. (316° C.) to be more selectively converted to middle distillate range products having improved pour points.

The catalytic particulates prepared in the present process can also be used in a process to dewax hydrocarbonaceous feeds. The catalytic dewaxing conditions are dependent in large measure on the feed used and upon the desired pour point. Generally, the temperature will be between about 200° C. and about 475° C., preferably between about 250° C. and about 450° C. The pressure is typically between about 200 psig and 3000 psig. The liquid space velocity (LHSV) preferably will be from 0.1 to 20 $hr^{-1}$, preferably between about 0.2 and about 10 $hr^{-1}$.

Hydrogen is preferably present in the reaction zone during the catalytic dewaxing process. The hydrogen to feed ratio is typically between about 500 and about 30,000 SCF/bbl (standard cubic feet per barrel), preferably about 1000 to about 20,000 SCF/bbl. Generally, hydrogen will be separated from the product and recycled to the reaction zone.

The dewaxing process may be used to dewax a variety of feedstocks ranging from relatively light distillate fractions up to high boiling stocks such as whole crude petroleum, reduced crudes, vacuum tower residua, cycle oils, synthetic crudes (e.g., shale oils, tars and oils, etc.), gas oils, vacuum gas oils, foot oils, and other heavy oils. The feedstock of the present process will normally be a $C_{10}$+ feedstock containing paraffins, olefins, naphthenes, aromatics, and heterocyclic compounds and with a substantial proportion of higher molecular weight n-paraffins and slightly branched paraffins which contribute to the waxy nature of the feedstock. The feedstock will normally boil above about 350° F. since lighter oils will usually be free of significant quantities of waxy components. However, the process is particularly useful with waxy distillate stocks such as middle distillate stocks including gas oils, kerosenes, and jet fuels, lubricating oil stocks, heating oils and other distillation fractions whose pour point and viscosity need to be maintained within certain specification limits. Lubricating oil stocks will generally boil above 230° C. (450° F.), more usually above 315° C. (600° F.), more usually above 315° C. (600° F.) Hydroprocessed stocks which include stocks which have been hydrotreated to lower metals, nitrogen and sulfur levels and/or hydrocracked, are a convenient source of stocks of this kind and also of other distillate fractions since they normally contain significant amounts of waxy n-paraffins. While the dewaxing process can be practiced with utility when the feed contains organic nitrogen (nitrogen-containing impurities), it is preferred that the organic nitrogen content of the feed be less than 50, more preferably less than 10, ppmw.

The catalytic particulates may be used to isomerize a waxy feedstock. The waxy feedstock preferably contains greater than about 50% wax, more preferably greater than about 90% wax. However, a highly paraffinic feed having a high pour point, generally above about 0° C., more usually above about 10° C., but containing less than 50% wax is also suitable for use in the process of the invention. Such a feed should preferably contain greater than about 70% paraffinic carbon, more preferably greater than about 80% paraffinic carbon, most preferably greater than about 90% paraffinic carbon.

Exemplary additional suitable feeds for use in the process of the invention include waxy distillate stocks such as gas oils, lubricating oil stocks, synthetic oils such as those by Fischer-Tropsch synthesis, high pour point polyalphaolefins, foots oils, synthetic waxes such as normal alphaolefin waxes, slack waxes, deoiled waxes and microcrystalline waxes. Foots oil is prepared by separating oil from the wax. The isolated oil is referred to as foots oil. Slack wax can be obtained from either a hydrocracked lube oil or a solvent refined lube oil. Hydrocracking is preferred because that process can also reduce the nitrogen content to low values. With slack wax derived from solvent refined oils, deoiling can be used to reduce the nitrogen content. Optionally, hydrotreating of the slack wax can be carried out to lower the nitrogen content thereof Slack waxes possess a very high viscosity index, normally in the range of from 140 to 200, depending on the oil content and the starting material from which the wax has been prepared. Slack waxes are therefore eminently suitable for the preparation of lubricating oils having very high viscosity indices, i.e., from about 120 to 180.

The present invention provides a unique lube oil product characterized by its combination of low pour point and high viscosity index. During dewaxing the pour point of the dewaxed product decreases relative to the pour point of the feed. A pour point of less than 10° C. is desired, and a pour point of less than 0° C. is preferred, with a pour point of less than about –5° C. being more preferred. In the present dewaxing process, the viscosity index of the dewaxed product is only marginally affected during dewaxing, and, in fact, can be seen to increase during the dewaxing process. A viscosity index of the dewaxed oil product of greater than about 90 is desired, and a viscosity index of greater than about 95 is preferred. However, with the use of the catalytic particulates of this process, a superior lubricating oil in terms of viscosity index and pour point properties are possible. Under these conditions, the lube oil may be characterized by a pour point below –24° C. and possibly as low as –63° C. or lower and a viscosity index between 125 and 180, suitably greater than about 130.

The present catalytic particulates may therefore be used in a process to prepare lubricating oils. The process comprises (a) hydrocracking in a hydrocracking zone a hydrocarbonaceous feedstock to obtain an effluent comprising a hydrocracked oil, and (b) catalytically dewaxing in a catalytic dewaxing zone the hydrocracked oil of step (a) with catalytic particulates comprising a non-zeolitic molecular sieve and a Group VIII metal, preferably platinum or palladium. In commercial operations, hydrocracking can take place as a single-step in the process, or as a multistep process using initial denitrification or desulfurization steps, all of which are well known. A typical hydrocracking process using zeolite Y is described, for example, in U.S. Pat. No. 5,158,665, the entire disclosure of which is incorporated herein by reference.

The hydrocarbonaceous feeds from which lube oils are made usually contain aromatic compounds as well as normal and branched paraffins of very long chain lengths. The feeds usually boil in the gas oil range. Preferred feedstocks are vacuum gas oils with normal boiling ranges in the range of 350° C. to 600° C., and deasphalted residual oils having normal boiling ranges from about 480° C. to 650° C. Reduced topped crude oils, shale oils, liquefied coal, coke distillates flash or thermally cracked oils, atmospheric residua, and other heavy oils can also be used. Another embodiment of this process includes an additional step of stabilizing the dewaxed hydrocrackate by catalytic hydrofinishing in a mild hydrogenation process. A description of a typical hydrofinishing process and catalyst is taught in U.S. Pat. No. 5,158,665.

EXAMPLE 1

SAPO-11 was prepared using the procedure in Example 5 of U.S. Pat. No. 5,208,005. The sieve was bound with 35% Catapal alumina and made into 1/10 inch extrudate. The extrudate was dried 3 hours at 121° C., and calcined in air for 4 hours at 454° C.

EXAMPLE 2

The extruded particulates prepared in Example 1 were impregnated with an aqueous solution containing 0.5% Pt (as $Pt(NH_3)_4Cl_2.H_2O$) by the pore-fill method. They were then dried for 2 hours at 93° C., 2 hours at 149° C., and calcined in air for 8 hours at 454° C.

EXAMPLE 3

Fifteen gram portions of SAPO-11 molecular sieve prepared by a method similar to Example 1 was bound with 15% Catapal alumina and made into 1/10 inch extrudate (Catalyst No. A1) and 1/16 inch extrudate (Catalyst No. C1). The extrudates were contacted with 8.4 ml of a solution of 145 mg platinum pentanedionate (CAS:15 170-57-7) in 10 ml toluene, each portion being agitated to ensure an even distribution of solution on the molecular sieve. The addition rate of the solution was adjusted to maintain a temperature of 25° C.–35° C. The impregnated molecular sieve samples were placed in a rotary evaporator and purged with a flow of dry nitrogen at room temperature. They were then tumbled as the temperature was slowly increased to 60° C. After the extrudates appeared dry, they were transferred to a large ceramic evaporating dish and placed in a programmable oven equipped with a gas inlet. The extrudates were then heated to 200° C. and held at that temperature for 8 hours, while the oven was purged with nitrogen. They were then cooled in the nitrogen flow. They were removed from the oven while still warm (≈60° C.) and immediately placed in a bottle with a tight seal. The recovered catalysts were labeled Catalyst No. A2 and Catalyst No. C2.

EXAMPLE 4

Extrudates were prepared by a method similar to Example 1, bound with 15% Catapal alumina and made into 1/10 inch extrudate (Catalyst No. B1) and 1/16 inch extrudate (Catalyst No. D1). The extrudates were impregnated with Pt by a procedure similar to that of Example 2, the finished catalytic particulates containing 0.4 wt % platinum. The recovered catalysts were labeled Catalyst No. B2, Catalyst No. B3 and Catalyst No. D2.

Argon physisorption measurements for micropore volumes were made at 87° K. in a OMNISORP 100-CX instruments. For each run, samples weighing 180 mg were vacuum-degassed at 300° C. for 2 hours. The data analysis was performed using α-plots. The α value was determined using CPG-75 silica glass supplied by Coulter Instruments. Micropore volumes and external areas for the samples were estimated from linear regressions of α=0.8 to α=1.0.

Dispersion measurements were based on the chemisorption of hydrogen on the hydrogenation metal on the catalytic particulates. Small samples of each test catalyst were saturated with hydrogen at 30° C., added in 50 micro liter pulses. The amount of hydrogen adsorbed (A1) was determined. Weakly adsorbed hydrogen was then removed by flushing the catalyst with argon for 20 minutes at 30° C. The catalytic particulates were again saturated with hydrogen, and the amount of hydrogen adsorbed in the second titration (A2) determined. The amount of strongly adsorbed hydrogen was calculated from (A1–A2). This amount was then related to the amount of platinum present in the sample.

Table I shows the results of the argon physisorption measurements. The results show that SAPO-11 containing particulates which were impregnated with a non-aqueous solution of a platinum compound retained a surprisingly high micropore volume relative to the SAPO-11 impregnated with the aqueous solvent, especially in view of the relatively smaller differences in surface area. This result is particularly surprising in view of the large effect on micropore volume at such mild treatment conditions during the impregnation and subsequent drying step.

EXAMPLE 5

Catalysts prepared by both non-aqueous impregnation of NZMS-containing particulates and aqueous impregnation of NZMS-containing particulates were tested for dewaxing a waxy heavy feed at 1950 psig pressure. Results are shown in Table II. According to Table II, the catalyst prepared by non-aqueous impregnation produced an acceptable dewaxed product at approximately 15–20° F. lower reactor temperature (compare catalyst B3 with catalyst A2 and catalyst D2 with catalyst C2). During runs to the same pour point (compare Catalyst B3 with Catalyst A2) the yield of lubricating oil (700° F.+ yield) was also significantly higher with the catalyst prepared using the non-aqueous solvent.

EXAMPLE 6

A catalyst is prepared according to the method of Example 1. The catalytic particulates comprise 85% SAPO-11 and 15% of a Catapal alumina matrix material. One test batch of the catalytic particulates is impregnated by the pore fill method with a solution of palladium pentanedionate dissolved in benzene. A second batch of the catalytic particulates is impregnated by the pore fill method with an aqueous solution of palladium nitrate. The micropore volume of the test batch impregnated with palladium pentanedionate is significantly higher than the micropore volume of the test batch impregnated with palladium nitrate. A catalytic test similar to that of Example 5 shows that the catalytic particulates prepared by the method of Example 6, using the non-aqueous solution, is catalytically superior to the catalytic particulates prepared using the aqueous solution.

TABLE I

| Catalyst (Note: Base catalysts were tested prior to impregnation) | | Micropore Volume | | External Area | | Dispersion |
|---|---|---|---|---|---|---|
| No. | Extrudate Dia, in | Type of Impregnation | microliters per gram | % of base | m²/g | % of base | H/Pt |
| A1 | 1/10" | Base | 71 | | 74 | | |
| A2 | 1/10" | Non-Aqueous | 60 | 85 | 88 | 120 | 0.84 |
| B1 | 1/10" | Base | 58 | | 98 | | |
| B2 | 1/10" | Aqueous | 35 | 60 | 110 | 112 | 0.80 |
| C1 | 1/16" | Base | 73 | | 80 | | |
| C2 | 1/16" | Non-Aqueous | 67 | 92 | 80 | 100 | 0.92 |
| D1 | 1/16" | Base | 66 | | 100 | | |
| D2 | 1/16" | Aqueous | 39 | 59 | 102 | 102 | 0.85 |

TABLE II

DEWAXING HEAVY WAXY BASE OIL AT 1950 PSIG
OVER WHOLE EXTRUDATE CATALYST

| Catalyst | B3 | A2 | D2 | C2 |
|---|---|---|---|---|
| Type of Impregnation | Aqueous | Non-Aqueous | Aqueous | Non-Aqueous |
| Extrudate Dia, in. | 1/10 | 1/10 | 1/16 | 1/16 |
| LHSV | 1.0 | 1.6 | 1.6 | 1.6 |
| Temperature, °F. | 740 | 725 | 741 | 720 |
| Pour Pt, °C. | −16 | −18 | −9 | −18 |
| 700° F. + yield, Wt % | 76.8 | 79.2 | 83.3 | 79.5 |

What is claimed is:

1. A process for preparing a non-zeolitic molecular sieve catalyst, said process comprising combining non-zeolitic molecular sieve-containing particulates having a first micropore volume with an active source of a hydrogenation component dissolved in a nonaqueous solvent to produce catalytic particulates having a second micropore volume which is at least about 70% of the first micropore volume.

2. The process according to claim 1 wherein the second micropore volume of the catalytic particulates is at least about 80% of the first micropore volume of the non-zeolitic molecular sieve-containing particulates.

3. The process according to claim 1 wherein the first micropore volume is at least about 50 microliters per gram of the non-zeolitic molecular sieve-containing particulates.

4. The process according to claim 1 wherein the second micropore volume is at least about 45 microliters per gram of catalytic particulates.

5. The process according to claim 1 wherein the hydrogenation component is platinum, palladium or mixtures thereof.

6. The process according to claim 5 wherein the active source of the hydrogenation component is platinum pentanedionate.

7. The process according to claim 1 wherein the catalytic particulates comprise in the range from about 0.05% to about 1.5% by weight of hydrogenation component based on the total weight of the catalytic particulates.

8. The process according to claim 1 wherein the non-aqueous solvent comprises a solvent selected from the group consisting of benzene, toluene, xylene; cyclohexane, cyclopentane, hexane, pentane, heptane, octane, nonane, decane; acetone, ethanol, methanol, propanol, butanol, methylene chloride, chloroform, carbon tetrachloride, $CH_3$—$CF_2$—$CH_2F$, and methyl, ethyl, propyl and butyl substituted analogs thereof.

9. The process according to claim 1 wherein the non-zeolitic molecular sieve is selected from the group consisting of SAPO-11, SAPO-31, SAPO-41 and SM-3.

10. The process according to claim 1 wherein the non-zeolitic molecular sieve-containing particulates comprise a matrix material.

11. The process according to claim 10 wherein the matrix material is selected from silica, alumina, titania, magnesia and mixtures thereof.

12. The process according to claim 10 wherein the non-zeolitic molecular sieve-containing particulates contain from about 45% to about 99% by weight of the non-zeolitic molecular sieve.

13. The process according to claim 12 wherein the non-zeolitic molecular sieve-containing particulates contain from about 45% to about 95% by weight of the non-zeolitic molecular sieve.

14. A process for preparing a non-zeolitic molecular sieve catalyst, said process comprising contacting non-zeolitic molecular sieve-containing particulates, having a first micropore volume, with a solution containing an active source of an hydrogenation component dissolved in a non-aqueous solvent and removing substantially all of the non-aqueous solvent at a temperature and for a time sufficient to produce a non-zeolitic molecular sieve catalytic particulates having a second micropore volume which is at least about 70% of the first micropore volume.

15. Catalytic particulates prepared using the process of claim 1.

16. Catalytic particulates prepared using the process of claim 14.

17. The catalytic particulates according to claim 16 comprising from about 45% to about 95% by weight of the non-zeolitic molecular sieve.

18. The catalytic particulates of claim 16 wherein the non-zeolitic molecular sieve has the crystal structure of SAPO-11.

19. Catalytic particulates comprising SAPO-11 and a hydrogenation component selected from platinum, palladium and mixtures thereof, the catalytic particulates having a micropore volume of greater than about 45 microliters per gram of particulate.

20. The catalytic particulates according to claim 19 having a micropore volume in the range of about 50 to about 100 microliters per gram of particulates.

* * * * *